United States Patent
Lin et al.

(10) Patent No.: US 7,420,624 B2
(45) Date of Patent: Sep. 2, 2008

(54) THREE-DIMENSIONAL VIDEO COMPOSITE SIGNAL DEMODULATING METHOD AND SYSTEM CAPABLE OF INHIBITING PSEUDO-COLOR NOISES

(75) Inventors: Chih-Ming Lin, Taipei (TW); Wei-Hsin Gu, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 616 days.

(21) Appl. No.: 11/181,847

(22) Filed: Jul. 15, 2005

(65) Prior Publication Data

US 2006/0044473 A1  Mar. 2, 2006

(30) Foreign Application Priority Data

Aug. 31, 2004   (TW) .............................. 93126177 A

(51) Int. Cl.
*H04N 9/78* (2006.01)
*H04N 9/77* (2006.01)

(52) U.S. Cl. ................. 348/663; 348/666; 348/609; 348/665

(58) Field of Classification Search ............. 348/663, 348/666, 665, 667, 669, 664, 609, 612
See application file for complete search history.

(56) References Cited

U.S. PATENT DOCUMENTS

| | | | | |
|---|---|---|---|---|
| 5,146,318 A | * | 9/1992 | Ishizuka et al. | 348/669 |
| 5,473,389 A | * | 12/1995 | Eto et al. | 348/669 |
| 5,500,686 A | * | 3/1996 | Yamaguchi et al. | 348/663 |
| 5,585,861 A | * | 12/1996 | Taniguchi et al. | 348/669 |
| 5,589,888 A | * | 12/1996 | Iwasaki | 348/669 |
| 5,990,978 A | * | 11/1999 | Kim et al. | 348/663 |
| 6,300,985 B1 | * | 10/2001 | Lowe et al. | 348/665 |
| 7,227,587 B2 | * | 6/2007 | MacInnis et al. | 348/667 |
| 7,324,163 B2 | * | 1/2008 | Bacche | 348/663 |

* cited by examiner

*Primary Examiner*—David Ometz
*Assistant Examiner*—Jean W Désir
(74) *Attorney, Agent, or Firm*—Bacon & Thomas, PLLC

(57) ABSTRACT

A three-dimensional video composite signal demodulating method and system capable of inhibiting pseudo-color noises. The system has a two-dimensional luminance and chroma signal separator, a three-dimensional luminance and chroma signal separator, a luminance weighting device, a chroma weighting device and a band pass filter. The method applies the two-dimensional luminance and chroma signal separator to obtain a two-dimensional luminance and chroma signal of a pixel, next the three-dimensional luminance and chroma signal separator to determine the pixel still or not according to a two-dimensional luminance and chroma signal change between a current frame and its previous and following frames with respect to the pixel, and gives appropriate weights to luminance and chroma signals generated by the two-dimensional and the three-dimensional luminance and chroma signal separators respectively, thereby respectively adding and obtaining separated luminance and chroma signals of the pixel.

11 Claims, 8 Drawing Sheets

THREE-DIMENSIONAL VIDEO COMPOSITE SIGNAL DEMODULATING METHOD AND SYSTEM CAPABLE OF INHIBITING PSEUDO-COLOR NOISES

BACKGROUND OF THE INVENTION

1. Field of the Invention

The invention relates to a video composite signal demodulating method and system and, more particularly, to a three-dimensional video composite signal demodulating method and system capable of inhibiting pseudo-color noises.

2. Description of Related Art

As shown in FIG. 1, a composite signal has luminance and chroma signal. In the NTSC (National Television System Committee) system, the chroma signal has a center frequency at 3.58 MHz, and in the PAL (Phase Alternation Line) system, the chroma signal has a center frequency at 4.43 MHz. When a video decoder receives a video composite signal, it uses a separator to perform a Y/C separation to separate the video composite signal's luminance and chroma signals for next proceeding.

FIG. 2 shows a schematic diagram of a typical Y/C separator. As shown in FIG. 2, the separator has a notch filter and a band pass filter. The notch filter reduces the chroma signal to accordingly obtain the luminance signal. Similarly, the band pass filter obtains the chroma signal. Since the chroma signal combines the luminance signal by a 3.58 (NTSC) or 4.43 (PAL) MHz carrier for transmission and a high frequency component of the luminance occupies a spectrum the same as the chroma signal, a signal originated from the luminance signal can be erroneously regarded as the chroma signal, even though the notch filter and the band pass filter can separate the luminance signal and the chroma signal, resulting in producing serious cross-color effect. Similarly, a signal originated from the chroma signal can be erroneously regarded as the luminance signal, thereby producing serious cross-luminance effect.

To overcome the cross-color effect and the cross-luminance effect, typically, a comb filter is used. However, the comb filter can reduce the cross-color effect and the cross-luminance effect only in a single direction (in horizontal direction or vertical direction). Therefore, it is desirable to provide an improved three-dimensional video composite signal demodulating method and system to mitigate and/or obviate the aforementioned problems.

SUMMARY OF THE INVENTION

The object of the invention is to provide a three-dimensional video composite signal demodulating method and system capable of inhibiting pseudo-color noises, which can eliminate the cross-color effect and the cross-luminance effect generated when separating luminance and chroma signals.

In accordance with one aspect of the invention, there is provided a three-dimensional video composite signal demodulating method capable of inhibiting pseudo-color noises, which decodes an input video composite signal in order to separate luminance and chroma signals of the input video composite signal. The method includes the steps: a two-dimensional luminance and chroma signal separating step, which separates a two-dimensional luminance signal and a two-dimensional chroma signal out of the input video composite signal; a three-dimensional luminance and chroma signal separating step, which separates a three-dimensional luminance signal, a three-dimensional chroma signal and an index out of the input video composite signal; a luminance weighting step, which performs a weighting operation on the two-dimensional and the three-dimensional luminance signals according to the index, thereby producing a weighted luminance signal; a chroma weighting step, which performs the weighting operation on the two-dimensional and the three-dimensional chroma signals according to the index, thereby producing a weighted chroma signal; a band pass filtering step, which performs a band pass filtering on the weighted chroma signal, thereby producing a filtered and weighted chroma signal; and a noise filtering step, which filters noises out of the weighted luminance signal and the filtered and weighted chroma signal, thereby producing the luminance signal and the chroma signal.

In accordance with another aspect of the invention, there is provided a three-dimensional video composite signal demodulating system capable of inhibiting pseudo-color noises, which decodes an input video composite signal in order to separate luminance and chroma signals of the input video composite signal. The system includes a two-dimensional luminance and chroma signal separator, a three-dimensional luminance and chroma signal separator, a luminance weighting device, a chroma weighting device, a band pass filter, and a noise filter. The two-dimensional luminance and chroma signal separator separates a two-dimensional luminance signal and a two-dimensional chroma signal out of the input video composite signal. The three-dimensional luminance and chroma signal separator separates a three-dimensional luminance signal, a three-dimensional chroma signal and an index out of the input video composite signal. The luminance weighting device is connected to the two-dimensional and the three-dimensional luminance and chroma signal separators in order to perform a weighting operation on the two-dimensional and three-dimensional luminance signals according to the index, thereby producing a weighted luminance signal. The chroma weighting device is connected to the two-dimensional and the three-dimensional luminance and chroma signal separators in order to perform the weighting operation on the two-dimensional and three-dimensional chroma signals according to the index, thereby producing a weighted chroma signal. The band pass filter is connected to the chroma weighting device to perform a band pass filtering on the weighted chroma signal, thereby producing a filtered and weighted chroma signal. The noise filter is connected to the band pass filter and the luminance weighting device in order to filter noises out of the weighted luminance signal and the filtered and weighted chroma signal respectively, thereby producing the luminance signal and the chroma signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
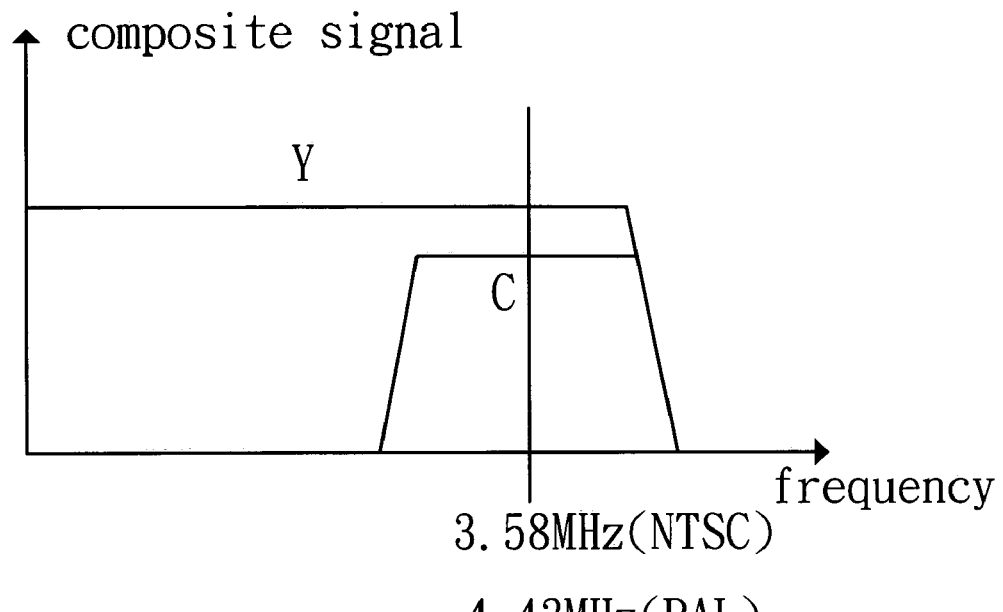
FIG. 1 is a schematic graph of a typical video composite signal.
Figure 2:
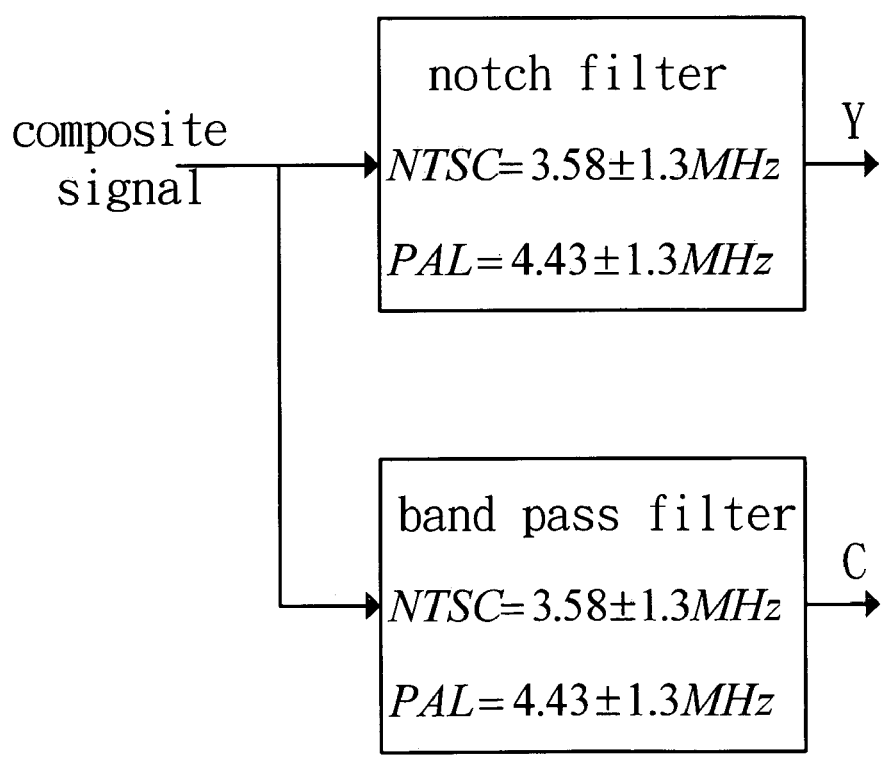
FIG. 2 shows a schematic diagram of a typical Y/C separator for luminance and chroma separation.
Figure 3:
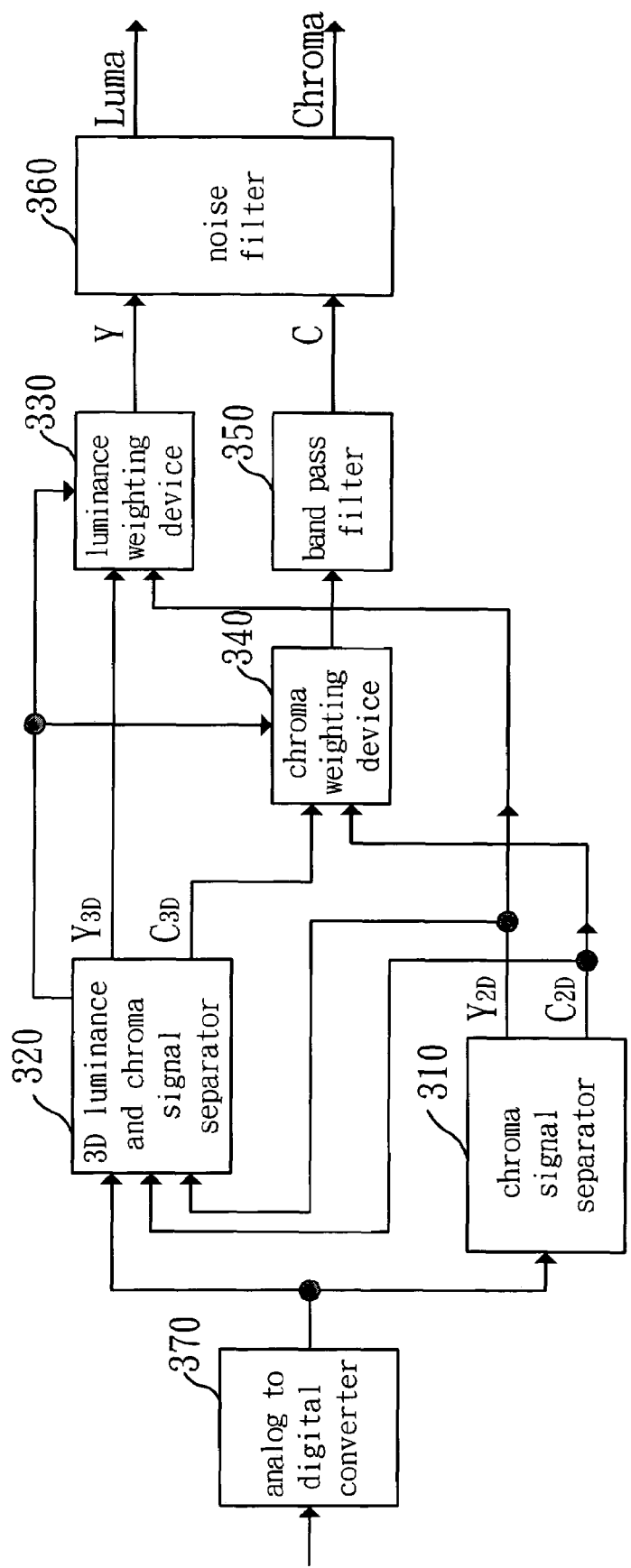
FIG. 3 is a block diagram of a three-dimensional video composite signal demodulating system capable of inhibiting pseudo-color noises according to the invention.

FIG. 3 is a block diagram of a three-dimensional video composite signal demodulating system capable of inhibiting pseudo-color noises according to the invention, which decodes an input composite signal in order to separate luminance and chroma signals of the input video composite signal. As shown in FIG. 3, the system includes a two-dimensional luminance and chroma signal separator 310, a three-dimensional luminance and chroma signal separator 320, a luminance weighting device 330, a chroma weighting device 340, a band pass filter 350 and a noise filter 360.

Figure 4:
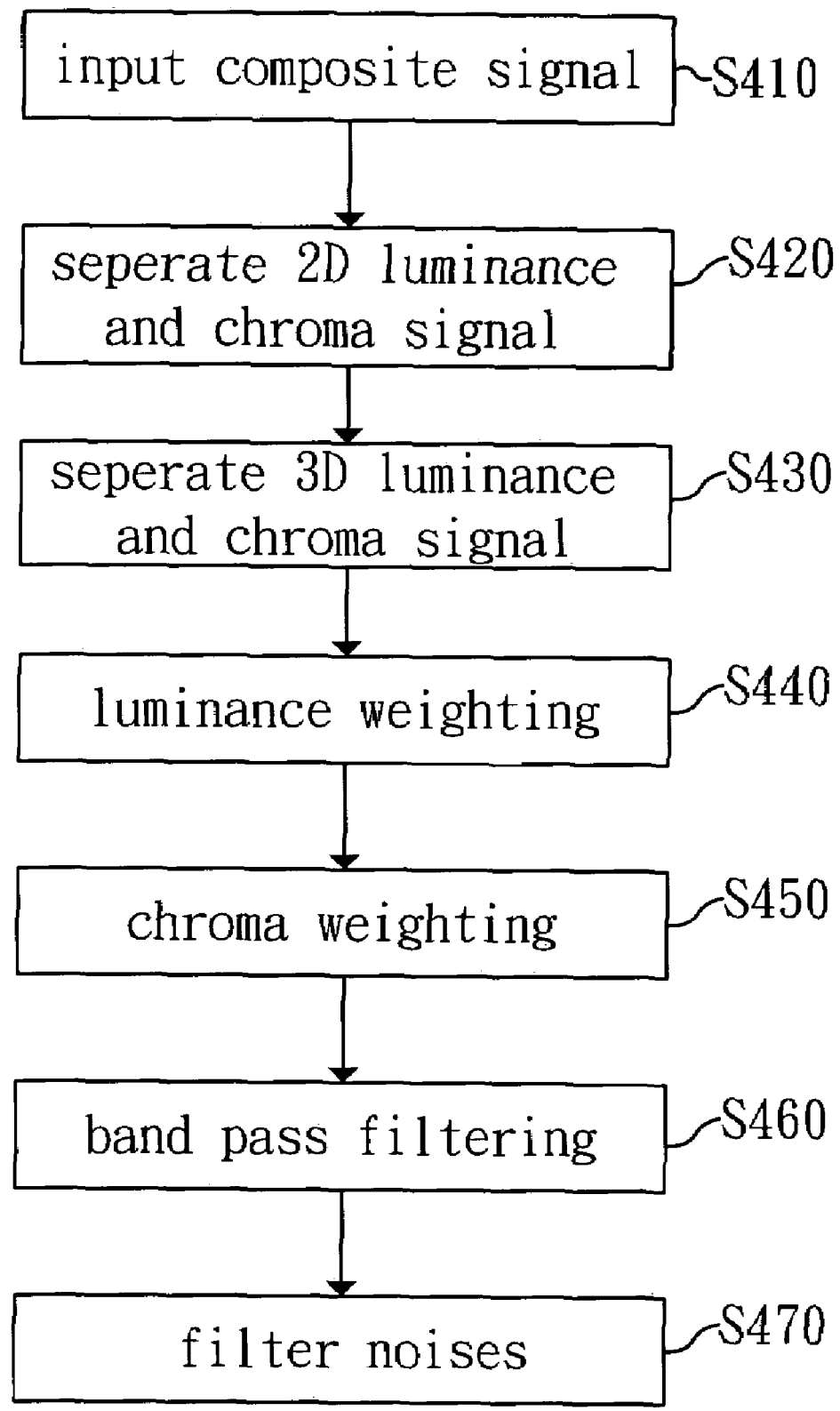
FIG. 4 is a flowchart of a three-dimensional video composite signal demodulating method capable of inhibiting pseudo-color noises according to the invention.
Figure 5:
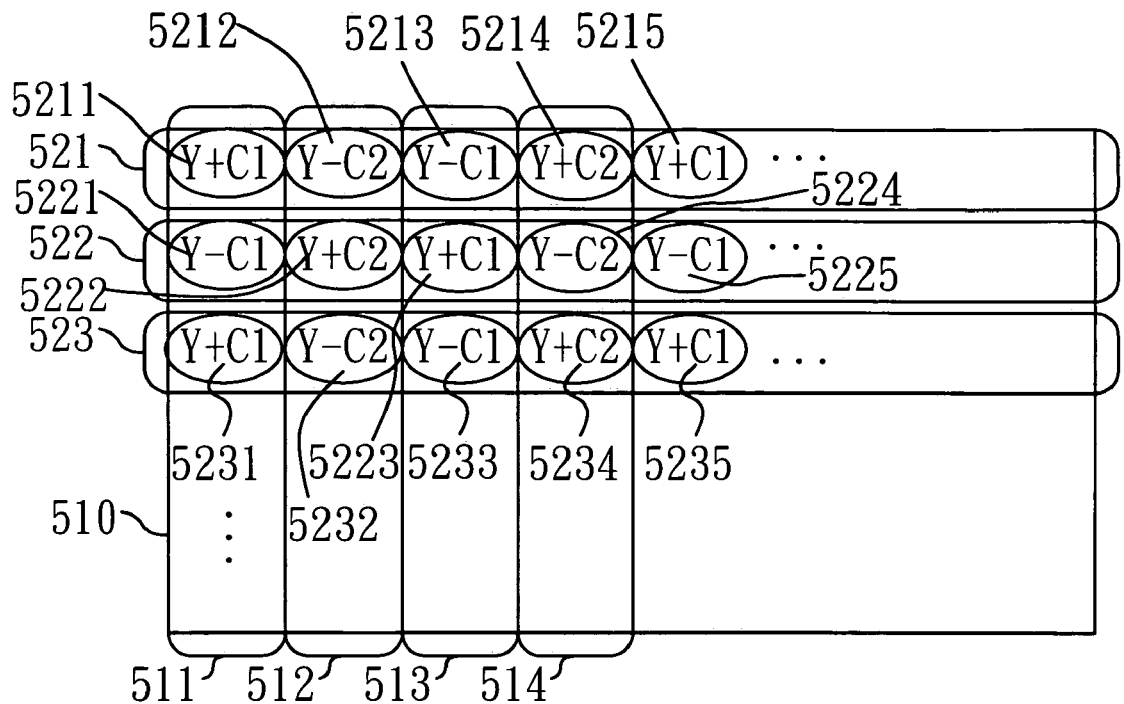
FIG. 5 is a schematic graph of a frame formed after conversion and sampling of an NTSC video composite signal according to the invention.

FIG. 4 is a flowchart of a three-dimensional video composite signal demodulating method capable of inhibiting pseudo-color noises according to the invention. Referring to FIGS. 3 and 4, step S410 inputs a video composite signal. The video composite signal can be represented by Y+C(=Y+Usinwt+Vcoswt) in an example of NTSC system. The video composite signal input is converted and sampled by an analog to digital converter 370 into a digital signal in a frame form of FIG. 5. As shown in FIG. 5, pixel 5211 is obtained by performing a 270-degree sampling on the NTSC video composite signal, i.e., wt=270 degrees in the equation Y+C=Y+Usinwt+Vcoswt, so that pixel 5211 can be Y+C1=Y−U, where C1=−U. Next, pixel 5212 is obtained by performing 0-degree sampling on the NTSC video composite signal so that pixel 5212 can be Y−C2=Y+V, where C2=−V. Next, pixel 5213 is obtained by performing 90-degree sampling on the NTSC video composite signal so that pixel 5213 can be Y−C1=Y+U, where C1=−U. Next, pixel 5214 is obtained by performing 180-degree sampling on the NTSC video composite signal so that pixel 5214 can be Y+C2=Y−V, where C2=−V. Next, pixel 5221 is obtained by performing (270+180)-degree sampling on the NTSC video composite signal, i.e., wt=90 degrees in the equation Y+C=Y+Usinwt+Vcoswt, so that pixel 5221 can be Y−C1=Y+U, where C1=−U. Next, pixel 5222 is obtained by performing 0+180-degree sampling on the NTSC video composite signal so that pixel 5222 can be Y+C2=Y−V, where C2=−V. Next, pixel 5223 is obtained by performing (90+180)-degree sampling on the NTSC video composite signal so that pixel 5223 can be Y+C1=Y−U, where C1=−U. Next, pixel 5224 is obtained by performing (180+180)-degree sampling on the NTSC video composite signal so that pixel 5224 can be Y−C2=Y+V, where C2=−V. Accordingly, the remaining pixels can be obtained in the same manner.

Figure 6:
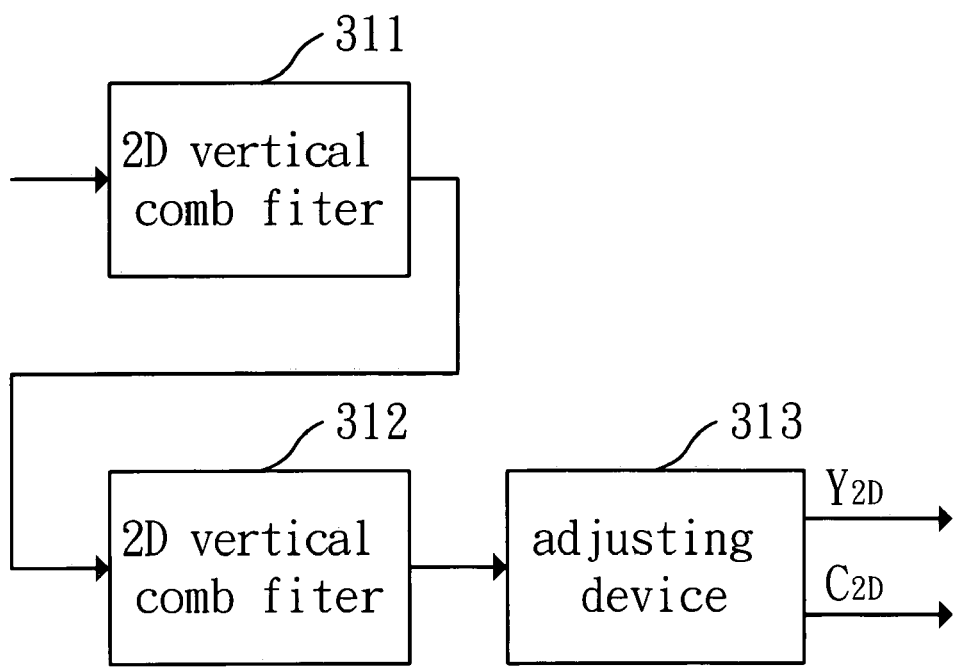
FIG. 6 is a block diagram of a two-dimensional luminance and chroma signal separator according to the invention.

FIG. 6 is a block diagram of the two-dimensional luminance and chroma signal separator 310 according to the invention. As shown in FIG. 6, the two-dimensional separator 310 includes a vertical comb filter 311, a horizontal comb filter 312 and an adjusting device 313. With the two-dimensional separator 310, a two-dimensional luminance signal $Y_{2D}$ and a chroma signal $C_{2D}$ are separated out of the video composite signal input (step S420).

For illustrative purpose, pixel 5223 of FIG. 5 is selected as an example. The two-dimensional vertical comb filter 311 finds horizontal luminance signals $Y_{h-1}$, $Y_{h0}$ and $Y_{h1}$ for pixels 5213, 5223 and 5233 respectively. In this case, the signal $Y_{h-1}$ of pixel 5213 is an average of video composite signals A, B, C respectively of pixels 5211, 5213, 5215, i.e., $Y_{h-1}$=[A+2*B+C]/4. Similarly, the signal $Y_{h0}$ of pixel 5223 is an average of video composite signals D, E, F respectively of pixels 5221, 5223, 5225, i.e., $Y_{h0}$=[D+2*E+F]/4. The signal $Y_{h1}$ of pixel 5233 is an average of video composite signals G, H, I respectively of pixels 5231, 5233, 5235, i.e., $Y_{h1}$=[G+2*H+I]/4.

Next, the two-dimensional vertical comb filter 311 further finds a vertical luminance signal 'dup' between pixels 5213, 5223 and a vertical luminance signal 'ddn' between pixels 5233, 5223. In this case, the vertical luminance signal 'dup' is an absolute value of ($Y_{h-1}$−$Y_{h0}$), i.e., dup=abs($Y_{h-1}$−$Y_{h0}$). The vertical luminance signal 'ddn' is an absolute value of ($Y_{h1}$−$Y_{h0}$), i.e., dup=abs($Y_{h1}$−$Y_{h0}$).

Therefore, according to the vertical luminance signal 'dup' between pixels 5213, 5223 and the vertical luminance signal 'ddn' between pixels 5233, 5223 found, the two-dimensional vertical comb filter 311 computes a vertical luminance signal 'Yv' and a vertical detection signal 'Dv' with respect to the pixel 5223, wherein Yv=[dup*(E+H)+ddn*(E+B)]/2(dup+ddn), and Dv=min(dup, ddn)+abs(H−B), where 'E' is the video composite signal of pixel 5223, 'B' is the video composite signal of pixel 5213, and 'H' is the video composite signal of pixel 5233.

The two-dimensional horizontal comb filter 312 finds horizontal luminance signal differences 'dl' and 'dr' for pixel 5223. The horizontal luminance signal difference 'dl' between pixels 5221, 5223 is an absolute value of a vertical luminance signal 'Yv5221' of pixel 5221 minus a vertical luminance signal 'Yv5223' of pixel 5223, i.e., dl=abs(Yv5221−Yv5223). The horizontal luminance signal difference 'dr' between pixels 5225, 5223 is an absolute value of a vertical luminance signal 'Yv5225' of pixel 5225 minus the vertical luminance signal 'Yv5223' of pixel 5223, i.e., dr=abs(Yv5225−Yv5223).

Therefore, according to the horizontal luminance signal 'dl' between pixels 5221, 5223 and the horizontal luminance signal 'dr' between pixels 5225, 5223 found, the two-dimensional horizontal comb filter 312 computes a horizontal luminance signal 'Yh' and a horizontal detection signal 'Dh' with respect to the pixel 5223, wherein Yh=[dl*(E+F)+dr*(E+D)]/2(dr+dl), and Dh=min(dl, dr)+abs(D−F), where 'E' is the video composite signal of pixel 5223, 'D' is the video composite signal of pixel 5221, and 'F' is the video composite signal of pixel 5225.

The adjusting device 313 computes a two-dimensional luminance signal $Y_{2D}$ according to the vertical luminance signal 'Yv', vertical detection signal 'Dv', horizontal luminance signal 'Yh' and horizontal detection signal 'Dh' of pixel 5223. When Dv=Dh, the signal $Y_{2D}$ equals to an average of the signals 'Yv' and 'Yh', i.e., $Y_{2D}$=(Yv+Yh)/2. When Dv>2*Dh, the signal $Y_{2D}$ equals to the signal 'Yv', i.e., $Y_{2D}$=Yv. Otherwise, the signal '$Y_{2D}$' is a combination of the signals 'Yv' and 'Yh', i.e., $Y_{2D}$=W*Yv+(1−W)Yh, where W is a weight. After the signal $Y_{2D}$ with respect to pixel 5223 is computed, the adjusting device 313 subtracts the signal $Y_{2D}$ from the respective video composite signal (Y+C) to accordingly obtain the two-dimensional chroma signal '$C_{2D}$' of pixel 5223. Similarly, in the PAL system, two-dimensional chroma and luminance signals of a pixel (i, j) can be computed by the same procedures, and thus a detailed description is deemed unnecessary.

Figure 7:
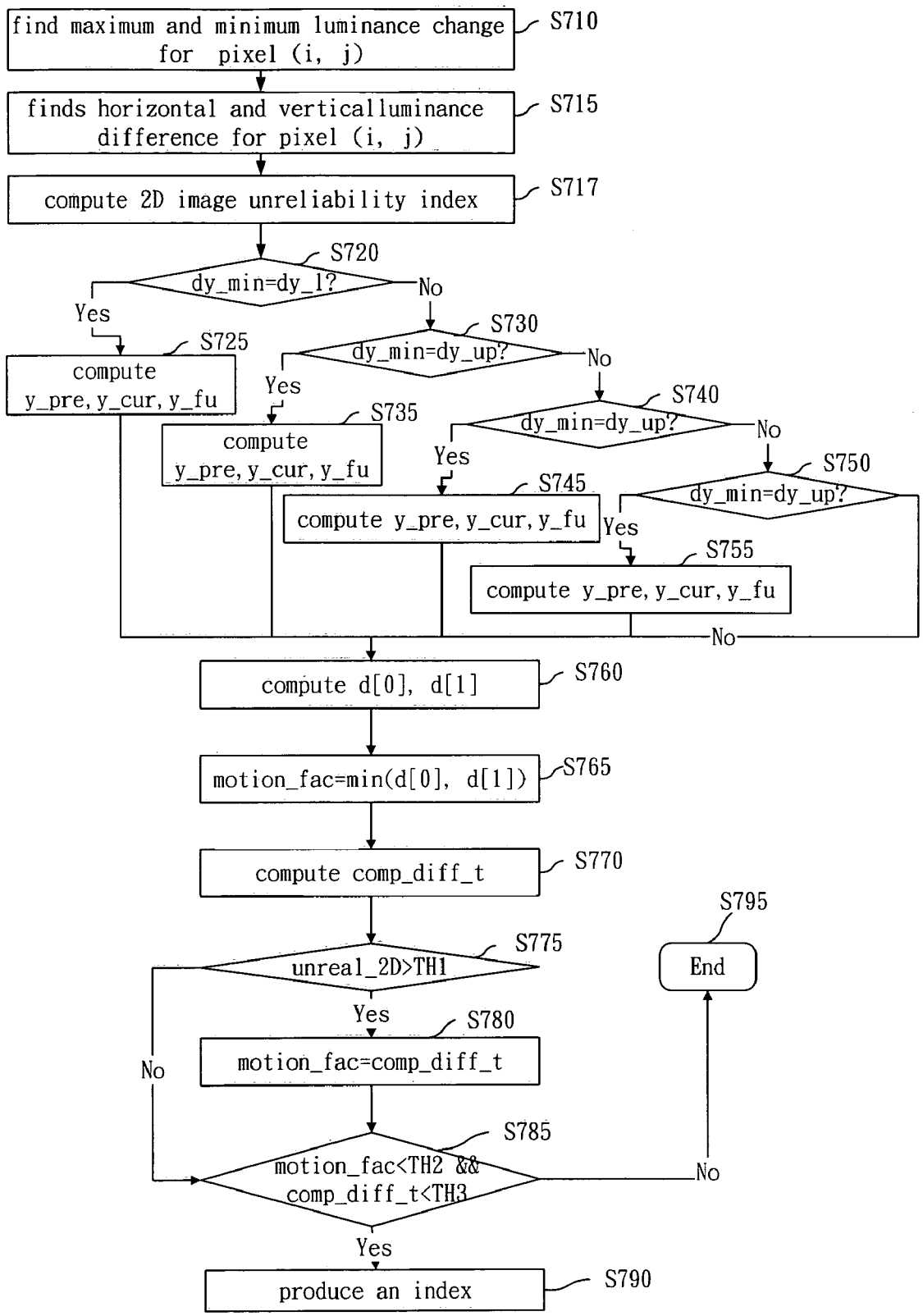
FIG. 7 is a detail flowchart of a three-dimensional luminance and chroma signal separation of FIG. 4 according to the invention.

The three-dimensional luminance and chroma signal separator 320 separates a three-dimensional luminance signal, a three-dimensional chroma signal and an index out of the input video composite signal (step S430), as shown in the flowchart of FIG. 7 which determines whether a pixel (i, j) is still or not. Namely, step S430 determines if the pixel (i, j) has no change (still) at location between two frames and accordingly produces an index. The device 320 can be carried out by a hardware descriptive language, for example, Verilog or VHDL according to the flowchart of FIG. 7.

Figure 8:
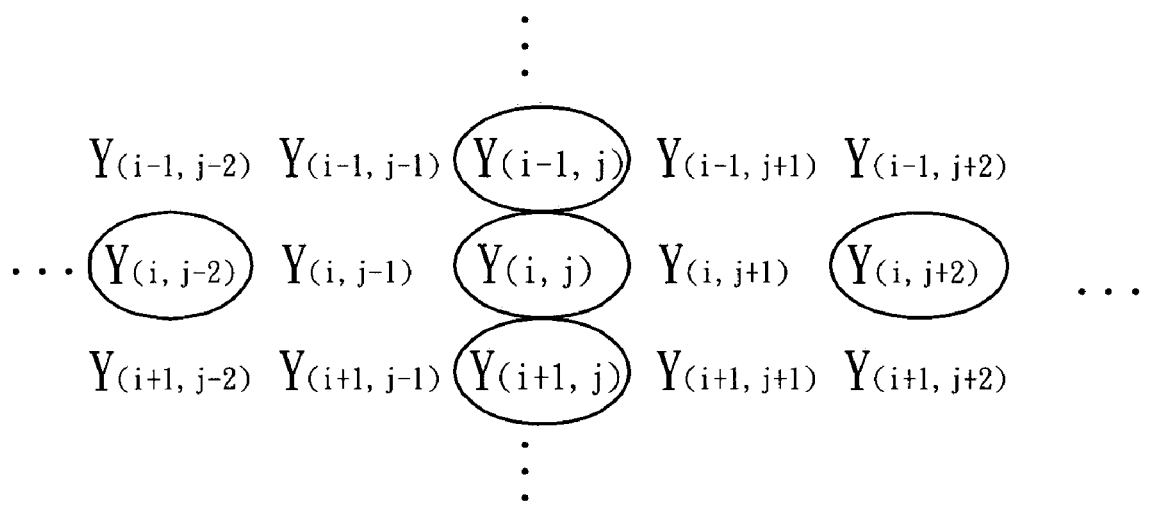
FIG. 8 is a schematic graph of finding a maximum and a minimum of luminance changes of a pixel (i,j) according to the invention.

Step S710 finds a maximum and minimum luminance change among all two-dimensional luminance signals produced by the two-dimensional separator 310 with respect to the pixel (i, j). As shown in FIG. 8, a luminance value Y (i, j) with respect to the pixel (i, j) and luminance values with respect to its adjacent pixels are used to find the minimum and maximum luminance change of the pixel (i, j), i.e., a minimum and maximum (dy_min, dy_max) among abs[Y(i,j)–Y(i,j–2)](dy_l), abs[Y(i,j)–Y(i,j+2)](dy_r), abs[Y(i,j)–Y(i–1,j)](dy_up) and abs[Y(i,j)–Y(i+1,j)](dy_down).

Step S715 finds a horizontal luminance difference (dy_h) and a vertical luminance difference (dy_v) with respect to the pixel (i, j). The difference (dy_h) is the maximum one selected from the signals dy_l and dy_r, i.e., dy_h=max(dy_l, dy_r). The difference (dy_v) is the maximum one selected from the signals dy_up and dy_down, i.e., dy_v=max(dy_up, dy_down).

Step S717 computes a two-dimensional image unreliability index 'unreal_2D' that is the minimum between the differences (dy_h) and (dy_v), i.e., unreal_2D=min(dy_h, dy_v).

Figure 9:
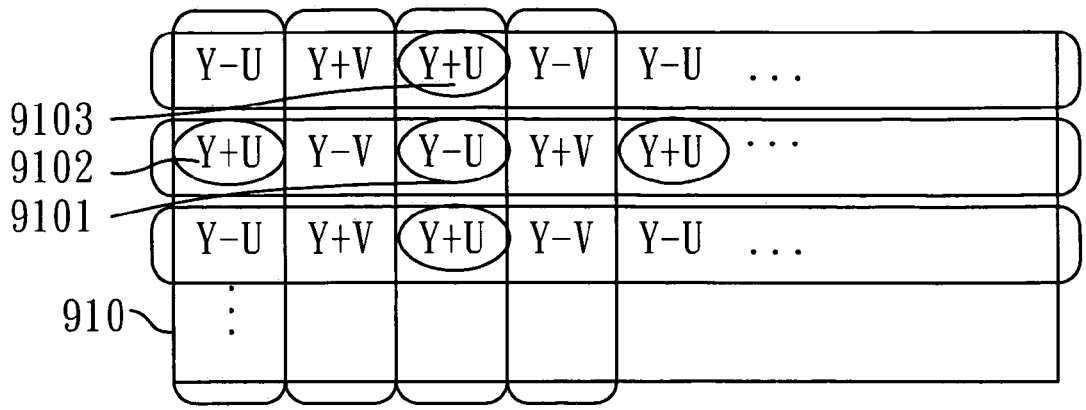
FIG. 9 is a chart of three-dimensional luminance signal computation according to the invention.
Figure 9:
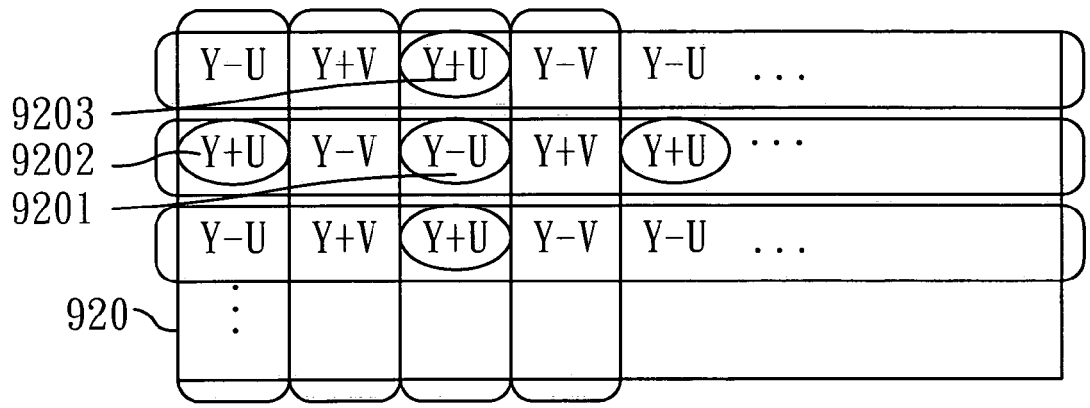
Figure 9:
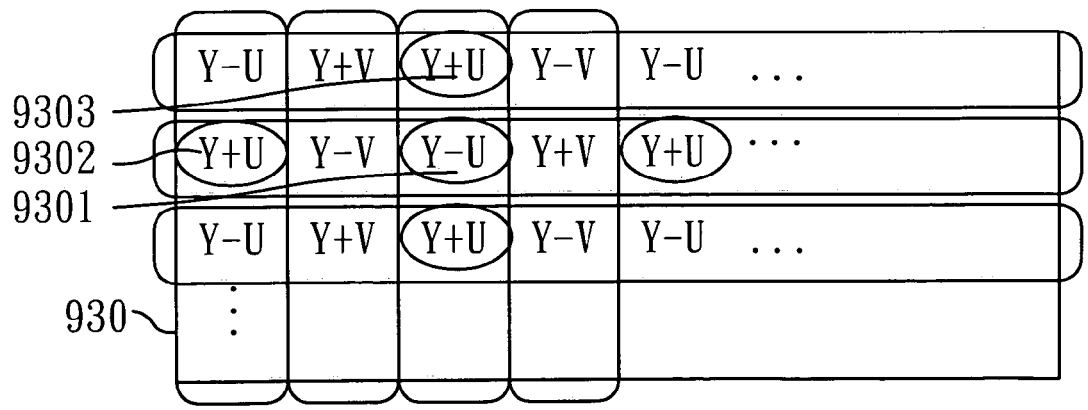

Step S720 determines if the minimum luminance change (dy_min) of the pixel (i, j) equals to the signal 'dy_l' indicating a luminance change between the pixel (i, j) and its left pixel (i, j-2). If the minimum luminance change (dy_min) of the pixel (i, j) is equal to abs[Y(i,j)–Y(i,j–2)](dy_l), step S725 is executed because, in this case, the pixel (i,j) has the minimum luminance change in a leftward direction. Thus, a three-dimensional luminance signal is produced by a video composite signal of a pixel of another frame at a position corresponding to the pixel (i,j). Referring to FIGS. 8 and 9, first frame 910 of FIG. 9 has a pixel 9101 corresponding to the pixel (i,j) of FIG. 8, second frame 920 of FIG. 9 has a pixel 9201 corresponding to the pixel (i,j) of FIG. 8, and first frame 930 of FIG. 9 has a pixel 9301 corresponding to the pixel (i,j) of FIG. 8. In this case, since the pixel (i,j) has the minimum luminance change as abs[Y(i,j)–Y(i,j–2)](dy_l), in the frame 910, a luminance (y_pre) of the pixel 9102 can be an average of a video composite signal (YC[(index–1)%3][i][j]) of the pixel 9101 and a video composite signal (YC[(index–1)%3][i][j–2]) of a pixel 9102. Similarly, in the frame 920, a luminance (y_cur) of the pixel 9201 can be an average of a video composite signal (YC[(index)%3] [i][j]) of the pixel 9201 and a video composite signal (YC[(index)%3][i][–2]) of a pixel 9202. Also, in the frame 930, a luminance (y_fu) of the pixel 9301 can be an average of a video composite signal (YC[(index+1)%3][i][j]) of the pixel 9301 and a video composite signal (YC[(index+1)%3][i][j–2]) of a pixel 9302.

Further, if the minimum luminance change (dy_min) of the pixel (i, j) is not equal to abs[Y(i,j)–Y(i,j–2)](dy_l), step S730 is executed to determine if the minimum luminance change (dy_min) equals to the signal 'dy_up' indicating a luminance change between the pixel (i, j) and its upper pixel (i–1, j). If the minimum luminance change (dy_min) is equal to abs[Y(i,j)–Y(i–1,j)](dy_up), step S735 is executed because, in this case, the pixel (i,j) has the minimum luminance change in an upward direction. Thus, referring again to FIGS. 8 and 9, in the frame 910, the luminance (y_pre) of the pixel 9102 can be an average of the video composite signal (YC[(index–1)%3][i][j]) of the pixel 9101 and a video composite signal (YC[(index–1)%3][i–1][j]) of a pixel 9103. In the frame 920, the luminance (y_cur) of the pixel 9201 can be an average of the video composite signal (YC[(index)%3][i][j]) of the pixel 9201 and a video composite signal (YC[(index)%3][i–1][j]) of a pixel 9203. In the frame 930, the luminance (y_fu) of the pixel 9301 can be an average of the video composite signal (YC[(index+1)%3][i][j]) of the pixel 9301 and a video composite signal (YC[(index+1)%3][i–1][j]) of a pixel 9303.

Similarly, if the pixel (i,j) has the minimum luminance change as abs[Y(i,j)–Y(i+1,j)](dy_down) or abs[Y(i,j)–Y(i, j+2)](dy_r), the respective three-dimensional luminance signals with respect to the pixel (i,j) can be obtained by the aforementioned procedures (steps S740, S745, S750, S755). Further, each three-dimensional chroma signal with respect to the pixel (i,j), or in the PAL system, each three-dimensional luminance signal and each chroma signal can be computed by the same procedures, and thus a detailed description is deemed unnecessary.

Next, referring again to FIGS. 7 and 9, MIN(d[0], d[1]) is selected according to luminance changes between the pixel (i,j) and its left, right, upper, lower pixels respectively. Accordingly, step S760 computes a luminance change d[0] between the first frame 910 and the second frame 920 with respect to the pixel (i,j), and a luminance change d[1] between the second frame 920 and the third frame 930 with respect to the pixel (i,j). Step S765 selects the minimum one from the two luminance changes, i.e., MIN(d[0], d[1]), as a motion factor 'motion_fac'. In addition, step S770 computes a luminance change between the first frame 910 and the third frame 930 with respect to the pixel (i,j), which is regarded as a compensation factor 'comp_diff_t'.

Step S775 determines if the two-dimensional image unreliability index 'unreal_2D' is greater than a first threshold 'TH1'. If unreal_2D> TH1, then it indicates that the two-dimensional luminance signal produced by the two-dimensional separator 310 is unreliable. In this case, the motion factor is reset to the compensation factor 'comp_diff_t', i.e., motion_fac=comp_diff_t (step S780). Otherwise, step S785 is executed.

Step S785 determines if the motion factor 'motion_fac' is smaller than a second threshold 'TH2' and the compensation factor 'comp_diff_t' is smaller than a third threshold 'TH3'. If the motion factor 'motion_fac' is smaller than a second threshold 'TH2' and the compensation factor 'comp diff_t' is smaller than a third threshold 'TH3', the pixel (i,j) is determined as a still point, thereby producing an index (step S790) for indicating that the pixel (i,j) is a still point. Otherwise, step S795 is executed.

Referring again to FIGS. 3 and 4, the luminance weighting device 330 is connected to the two-dimensional and the three-dimensional luminance and chroma signal separators 310, 320 in order to perform a weighting operation on the two-dimensional and three-dimensional luminance signals when the index indicates the pixel (i,j) to be the still point, thereby producing a weighted luminance signal. When the index indicates that the pixel (i,j) is not a still point, the two-dimensional luminance signal is set to be the weighted luminance signal (step S440). The chroma weighting device 340 is connected to the two-dimensional and the three-dimensional luminance and chroma signal separators 310, 320 in order to perform the weighting operation on the two-dimensional and three-dimensional chroma signals when the index indicates the pixel (i,j) to be the still point, thereby producing a weighted chroma signal. When the index indicates that the pixel (i,j) is not a still point, the two-dimensional chroma signal is set to be the weighted chroma signal (step S450).

The band pass filter 350 is connected to the chroma weighting device 340 to perform a band pass filtering (step S460) on the weighted chroma signal, thereby producing a filtered and weighted chroma signal, which can filter residual luminance signal out of the weighted chroma signal.

Figure 10:
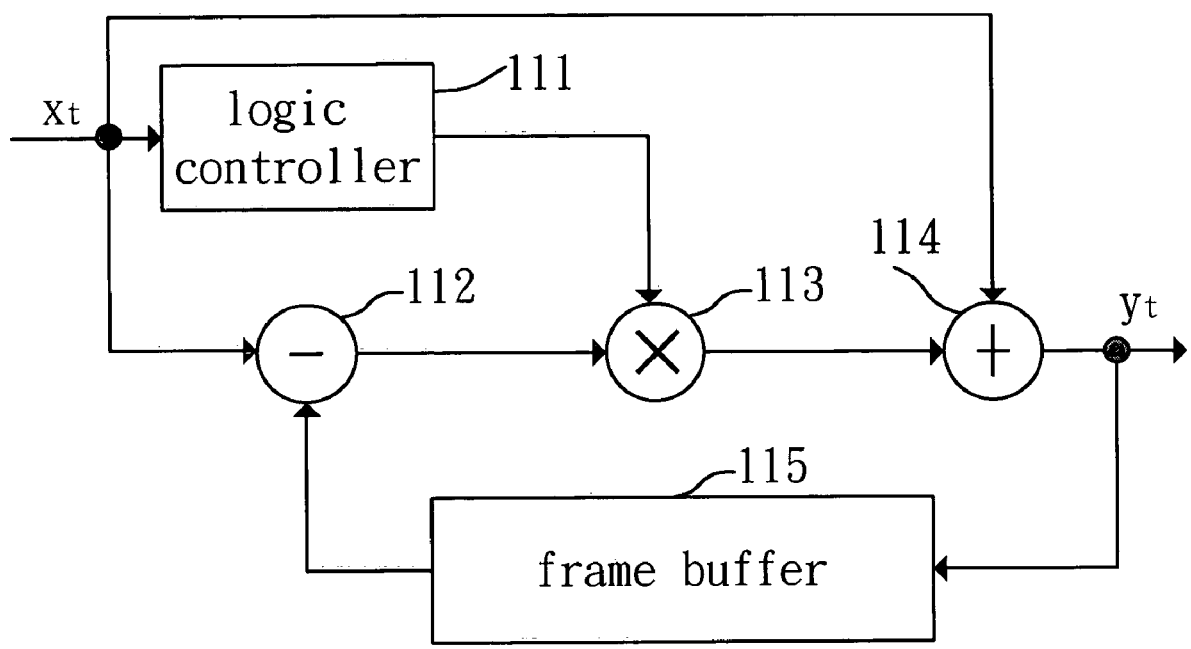
FIG. 10 is a block diagram of a noise filter according to the invention.

The noise filter 360 is connected to the band pass filter 350 and the luminance weighting device 330 in order to filter noises out of the weighted luminance signal and the filtered and weighted chroma signal (step S470), thereby producing low-noise luminance and chroma signals. FIG. 10 shows a block diagram of the noise filter 360, which has a logic controller 111, a subtractor 112, a multiplier 113, an adder 114 and a frame buffer 115. The relation between the input (x) and output (y) of the noise filter 360 is: $y_t=(1-\gamma_t)x_t+\gamma_t y_{t-1}$, for $t \geq 1$, and $0 \leq \gamma_t \leq \gamma_{max} < 1$, which is an infinite impulse response (IIR) filter to filter noises out of the input signal, thereby producing low-noise luminance and chroma signals.

In view of the foregoing, it is known that the invention applies luminance changes between the pixel (i,j) and its adjacent pixels to dynamically separate luminance and chroma signals of the pixel (i,j). The two-dimensional luminance and chroma signals of the pixel (i,j) is obtained by the two-dimensional luminance and chroma signal separator 310. Then, the three-dimensional luminance and chroma signal separator 320 determines the pixel (i,j) still or not, according to two-dimensional luminance signal changes between a current frame and its previous and following frames with respect to the pixel (i,j), thereby obtaining three-dimensional luminance and chroma signals of the pixel (i,j). Next, the two-dimensional luminance and chroma signals obtained by the two-dimensional separator 310 and the three-dimensional luminance and chroma signals obtained by the three-dimensional separator 320 are weighted separately and added respectively, i.e., the two luminance signals are added and the two chroma signals are added. Thus, the pixel (i,j) are separated into luminance signal and chroma signal, i.e., separated luminance and chroma signals of the pixel (i,j) are obtained.

Although the present invention has been explained in relation to its preferred embodiment, it is to be understood that many other possible modifications and variations can be made without departing from the spirit and scope of the invention as hereinafter claimed.

What is claimed is:

1. A three-dimensional video composite signal demodulating method capable of inhibiting pseudo-color noises, which decodes an input video composite signal in order to separate a luminance signal and a chroma signal of the input video composite signal, the method comprising:

a two-dimensional luminance and chroma signal separating step, which separates a two-dimensional luminance signal and a two-dimensional chroma signal out of the input video composite signal;

a three-dimensional luminance and chroma signal separating step, which separates a three-dimensional luminance signal, a three-dimensional chroma signal and an index out of the input video composite signal;

a luminance weighting step, which performs a weighting operation on the two-dimensional and the three-dimensional luminance signals according to the index, thereby producing a weighted luminance signal;

a chroma weighting step, which performs the weighting operation on the two-dimensional and the three-dimensional chroma signals according to the index, thereby producing a weighted chroma signal;

a band pass filtering step, which performs a band pass filtering on the weighted chroma signal, thereby producing a filtered and weighted chroma signal; and a noise filtering step, which filters noises out of the weighted luminance signal and the filtered and weighted chroma signal, thereby producing the luminance signal and the chroma signal.

2. The method as claimed in claim 1, wherein in the luminance weighting step, when the index indicates a respective pixel to be a still point, the weighting operation is performed on the two-dimensional and the three-dimensional luminance signals, thereby producing the weighted luminance signal; when the index indicates the respective pixel not to be the still point, the two-dimensional luminance signal is set to be the weighted luminance signal.

3. The method as claimed in claim 2, wherein in the chroma weighting step, when the index indicates the respective pixel to be the still point, the weighting operation is performed on the two-dimensional and the three-dimensional chroma signals, thereby producing the weighted chroma signal; when the index indicates the respective pixel not to be the still point, the two-dimensional chroma signal is set to be the weighted chroma signal.

4. The method as claimed in claim 1, wherein the input video composite signal is an NTSC video composite signal.

5. The method as claimed in claim 1, wherein the input video composite signal is a PAL video composite signal.

6. A three-dimensional video composite signal demodulating system capable of inhibiting pseudo-color noises, which decodes an input video composite signal in order to separate a luminance signal and a chroma signal of the input video composite signal, the system comprising:

a two-dimensional luminance and chroma signal separator, which separates a two-dimensional luminance signal and a two-dimensional chroma signal out of the input video composite signal;

a three-dimensional luminance and chroma signal separator, which separates a three-dimensional luminance signal, a three-dimensional chroma signal and an index out of the input video composite signal;

a luminance weighting device, which is connected to the two-dimensional and the three-dimensional luminance and chroma signal separators in order to perform a weighting operation on the two-dimensional and three-dimensional luminance signals according to the index, thereby producing a weighted luminance signal;

a chroma weighting device, which is connected to the two-dimensional and the three-dimensional luminance and chroma signal separators in order to perform the weighting operation on the two-dimensional and three-dimensional chroma signals according to the index, thereby producing a weighted chroma signal;

a band pass filter, which is connected to the chroma weighting device to perform a band pass filtering on the weighted chroma signal, thereby producing a filtered and weighted chroma signal; and a noise filter, which is connected to the band pass filter and the luminance weighting device in order to filter noises out of the weighted luminance signal and the filtered and weighted chroma signal respectively, thereby producing the luminance signal and the chroma signal.

7. The system as claimed in claim 6, wherein the luminance weighting device performs the weighting operation on the two-dimensional and the three-dimensional luminance signals when the index indicates a respective pixel to be a still point, thereby producing the weighted luminance signal; and the luminance weighting device sets the two-dimensional luminance signal to be the weighted luminance signal when the index indicates the respective pixel not to be the still point.

8. The system as claimed in claim 6, wherein the chroma weighting device performs the weighting operation on the two-dimensional and the three-dimensional chroma signals when the index indicates the respective pixel to be the still point, thereby producing the weighted chroma signal; and the chroma weighting device sets the two-dimensional chroma signal to be the weighted chroma signal when the index indicates the respective pixel not to be the still point.

9. The system as claimed in claim 6, wherein the input video composite signal is an NTSC video composite signal.

10. The system as claimed in claim 6, wherein the input video composite signal is a PAL video composite signal.

11. The system as claimed in claim 6, wherein the two-dimensional luminance and chroma signal separator comprises a two-dimensional vertical comb filter to compute a pixel's vertical luminance signal, vertical luminance detection signal, vertical chroma and vertical chroma detection signal; a two-dimensional horizontal comb filter to compute the pixel's horizontal luminance signal, horizontal luminance detection signal, horizontal chroma signal and horizontal chroma detection signal; and an adjusting device to compute a respective two-dimensional luminance signal according to the vertical luminance signal, the vertical luminance detection signal, the horizontal luminance signal and the horizontal luminance detection signal, and a respective two-dimensional chroma signal according to the vertical chroma signal, the vertical chroma detection signal, the horizontal chroma signal and the horizontal chroma detection signal, wherein when the pixel corresponds to the input video composite signal, the respective two-dimensional luminance signal and the respective two-dimensional chroma signal correspond to the two-dimensional luminance signal and the two-dimensional chroma signal respectively.

* * * * *